United States Patent [19]

Noyon

[11] 4,162,017

[45] Jul. 24, 1979

[54] GRANULAR OR PULVERULENT PRODUCT STORING AND HANDLING INSTALLATION

[75] Inventor: Gustave M. Noyon, Paris, France

[73] Assignee: Societe Internationale d'Investissements et de Participations par abreviation INTERPAR, Paris, France

[21] Appl. No.: 760,769

[22] Filed: Jan. 10, 1977

[30] Foreign Application Priority Data

Jan. 13, 1976 [FR] France .............................. 76 00674

[51] Int. Cl.² ........................................... B65G 47/00
[52] U.S. Cl. .................................... 414/313; 414/287
[58] Field of Search ............. 214/17 CB, 17 C, 17 D, 214/17 DB, 10, 15 C, 93, 16 R

[56] References Cited

U.S. PATENT DOCUMENTS

| | | | |
|---|---|---|---|
| 3,438,517 | 11/1966 | Steffen ............................ | 214/17 CB |
| 3,487,961 | 1/1970 | Neuenschwander ........... | 214/17 CB |
| 3,713,552 | 1/1973 | Schnyder .......................... | 214/17 D |
| 3,851,749 | 12/1974 | Vidal ..................................... | 214/10 |
| 3,876,187 | 4/1975 | Waltman ............................. | 198/560 |
| 3,908,838 | 9/1975 | Hanss ..................................... | 214/10 |

*Primary Examiner*—Drayton E. Hoffman
*Assistant Examiner*—Lawrence E. Williams
*Attorney, Agent, or Firm*—Wenderoth, Lind & Ponack

[57] ABSTRACT

An installation for storing and handling a granular or pulverulent product, comprising a vessel for storing the product, which may be extracted by means of at least one handling apparatus comprising a raking scoop which causes, during its active travel, the product to pour over the upper edge of an upwardly divergent wall of the vessel. The storage vessel is disposed in a store protected from the exterior medium. The handling apparatus, or each handling apparatus is constituted by a dragline the raking scoop of which is carried by a rigid boom which is mounted on a movable frame located outside the vessel in a high position adjacent the divergent wall of the vessel. A device is provided for filling the vessel and adapted to pour the product in the vicinity of the path described by the end of the dragline boom opposed to the frame.

20 Claims, 5 Drawing Figures

- Fig 2 -

GRANULAR OR PULVERULENT PRODUCT STORING AND HANDLING INSTALLATION

The handling of granular and pulverulent products which have a tendency to agglomerate or set into a mass poses difficult problems as concerns taking up and extracting them from stores in which they are stored.

It will be understood that in respect of such products (for example fertilizers and ground ameliorators) it is impossible to empty a silo or storage bin by the mere effect of gravity, especially if the product has been stored therein for a rather long period of time. This is why these products are usually stored in a heap on the ground in bunkers or compartments which are open on one side and taken up by means of a charging scoop. In view of the fact that the charging scoop produces by the effect of the removal of material a practically vertical slope, it is necessary to considerably limit the height of the heaps in order to limit the ever-present danger of the sliding or collapse of the material onto the charger and its driver. Moreover, the movements of the charger require covered areas which cannot be used for storage. It will be understood that a store designed in this way requires a very large area on the ground with respect to the storable volume.

Apart from the aforementioned danger due to the collapse of the material, the known installations have serious drawbacks in respect of the working conditions of the driver of the charger who, on one hand, is subjected to the shaking inherent in this type of machine and, on the other hand, must wear a gas mask when, as is often the case, the products produce an intense dust which pollutes the air.

Furthermore, pulverulent products, such as ground ameliorators and certain chemical products, have an angle of rest when heaped which is usually very small and that consequently the known installations do not lend themselves well to their storage.

The present invention concerns a handling installation which may be rendered fully automatic and comprises a closed store so that the control of the product input and output operations, whether the product be granular or pulverulent, is carried out from outside the store which ensures hygienic and safe conditions for the operators.

This installation is specially designed for a new utilization of a known handling apparatus, namely the automatic dragline utilized for the formation of heaps of aggregates in concrete preparation centres.

It is known that the main tool of such a dragline is a scoop or bucket which is open in the lower and front parts and closed on the lateral sides in the upper and rear parts. This scoop is controlled by a raking cable, which is fixed by means of chains in the region of the front of the scoop, and a handling cable which is fixed in the region of the rear of the scoop. The two cables are actuated by two winches located in a frame which supports a boom. The cable of the raking winch passes around a pulley which is carried by the boom and located in the immediate vicinity of the frame. The cable of the handling winch passes around another pulley located at the opposite end of the boom. The scoop is made to undergo an automatic cyclic motion whereby it is possible to raise the product along a heap whose top or crest is located in the vicinity of and below the frame of the dragline.

The frame of the dragline is usually mounted to pivot about a vertical axis. After each cycle of the scoop, the frame is automatically made to undergo a rotation of very small amplitude so as to sweep across the entire width of a storage bunker defined by two partition walls which are on principle radial walls. Owing to the automatic sweeping motion, it is easy to obtain a regular raising of the heap throughout the width of the bunker. The heap thus constituted permits an extraction of the product, by means of an opening located at the lower point of the heap and in vertical alignment with the frame of the dragline. If the heap is formed without operation of the dragline and the bunker is to be emptied, this emptying will be limited to the product located within a cone whose point is located in the region of the opening and whose apex angle corresponds to the complement of the angle of rest or the natural slope of the heaped product. This cone is termed an active cone and the purpose of the dragline is to regularly supply this active cone.

It will be understood that such an installation cannot be used with products having a tendency to agglomerate or set into a mass. Indeed, the product generally would not be able to flow through an opening located at the base of the heap when the product has been stored a certain period of time. Moreover, the installation requires a considerable storage area for a very small useful volume. This does not constitute an inconvenience in respect of aggregates which are stored in the open air, but the use in the conventional way of the dragline for products which must be stored under cover would result in unacceptable building construction expenses.

In a known installation, comprising an open-air storage vessel, a scoop carried and moved by a system of cables passing around pulleys supported by the vessel can, in the course of an active travel, extract the product in constraining it to pour itself over the upper edge of an upwardly divergent wall of the vessel. In the absence, on one hand, of a rigid and mobile superstructure for supporting this scoop and, on the other hand, appropriate means for filling the vessel, this installation does not lend itself to an automatic handling of the product and does not permit a safe treatment of a product which is pollutant.

According to the invention, there is provided an installation for storing and handling a granular or pulverulent product comprising a vessel for the storage of the product which may be extracted by means of at least one handling apparatus comprising a raking scoop which causes, during its active travel, the product to pour over the upper edge of an upwardly divergent wall of the vessel, wherein the storage vessel is disposed in a store protected from the exterior medium in the known manner, the handling apparatus, or each handling apparatus, is constituted by a dragline known per se the raking scoop of which is carried by a rigid boom which is mounted on a movable frame located outside the vessel in a high position adjacent the divergent wall of the vessel, and means are provided for filling the vessel, said means being adapted to pour the product in the vicinity of the path described by the end of the dragline boom opposed to the frame.

In such an installation, the pouring of the product in vertical alignment with points very near to the path of the end of the dragline boom opposed to the frame ensures a full filling of the vessel, or of a compartment of the vessel, the product assuming a slope corresponding to its angle of rest when heaped and extending up to the top of the divergent wall. The dragline, whose frame is disposed a little above the divergent wall, does not fill in advance an active cone in raising the product, but, on the contrary, causes, at the start of the emptying, the product to descend by sliding on the angle of rest of the product until it pours itself into a receiving apparatus after having passed over the top of the divergent wall then, as emptying proceeds, in order to permit this pouring, raises the product which is located in the zone in the vicinity of the horizontal projection of the path of the free end of the boom, so as to cause it to descend onto that which remains of the initial natural slope or bank of the heaped product and finally, when the residual volume of product is located below the upper edge of the divergent wall, the scoop completes the emptying by pouring after having slid in contact with the divergent wall.

The proposed installation may be rendered fully automatic by providing a remote control for the filling means which are to perform a simple function consisting in pouring the product while describing a sweeping motion, and by adopting for the control of the complex cycles of the raking scoop, the control system (which is hardly modified) of the rigid-boom dragline employed in concrete preparation centres. In certain cases, the remote control of the filling means may moreover be integrated into the control system of the dragline.

A store constructed in accordance with the invention may be circular or rectangular.

In a circular store, the frame of the dragline is mounted to be pivotable about a vertical axis coinciding with the centre of this store and the vessel is defined by the divergent wall, which is in the form of a truncated cone, and by a higher vertical wall constituting the outer cylindrical wall of the store. The extracted product is poured into a centre hopper and is discharged to the exterior by a conveyor belt installed in a horizontal gallery located in the lower part of the vessel. The vessel of the circular store may be divided into a number of compartments or bunkers by radial partition walls. In order to ensure the filling of the bunkers by a pouring of the product in the immediate vicinity of the outer wall and along the latter, there is provided on the pivotal frame of the dragline, in a position diametrally opposed to the boom, a support provided with a conveyor belt which is oriented radially and substantially horizontally and conveys the product received in the centre of the store to the vicinity of the outer wall. This conveyor belt is fed by means of a horizontal conveyor belt disposed on or under the cover or roof of the store and supplied with product by means of an elevator outside the store. In order to fill a bunker, the automatic control of the rotation of the dragline is put in operation, with the scoop held stationary. The filling conveyor belt is therefore made to undergo a rotational motion which sweeps across the whole of the bunker and the filling of the latter can therefore be complete. It is advantageous in this respect that the vessel comprise either two bunkers defined by two partition walls coinciding with a common diameter or a plurality of pairs of bunkers in ech of which the two bunkers are defined by radial partition walls which define two opposed angles at the apex.

In the case of a rectangular store, there may be provided a single dragline mounted on a carriage which moves in translation on rails located outside and above the divergent wall which defines, with an outer higher vertical planar wall of the store, the storage vessel. The cyclic motions of the scoop of the dragline are the same as in the case of the circular store. The vessel, or the bunkers of the vessel, are filled for example by means of two conveyor belts disposed in the vicinity of the higher wall, one of which belts is supplied by means of an elevator outside the store and is fixed and discharges the product onto the other conveyor which is movable in translation in the known manner.

It is also possible to construct a rectangular store which has two draglines symmetrically disposed and movable on runways provided on the respective edges of the store, the vessel being then defined by two corresponding divergent walls between which walls the mass of product may be retained in the form of a prism having a double slope, the upper edge of which is in vertical alignment with the median line along which the filling means pour the product. Such an installation results in a considerable storage capacity under economic conditions.

In any case, the store is completely closed and the handling operations can be remote-controlled from outside, in particular by means already provided in the known dragline and employed in the open air for the handling of aggregates.

The store can therefore be perfectly sealed and consequently the handling of the products, and even pulverulent products, results in no exterior pollution. Moreover, the dish or cup shape of the bunkers permits such a store to be constructed even for pulverulent products having a very small angle of rest when heaped.

The invention will be better understood with reference to the two embodiments described hereinafter, it being understood that other arrangements different from the described arrangements may be adopted while remaining within the scope of the invention.

FIRST EXAMPLE

Figure 1:
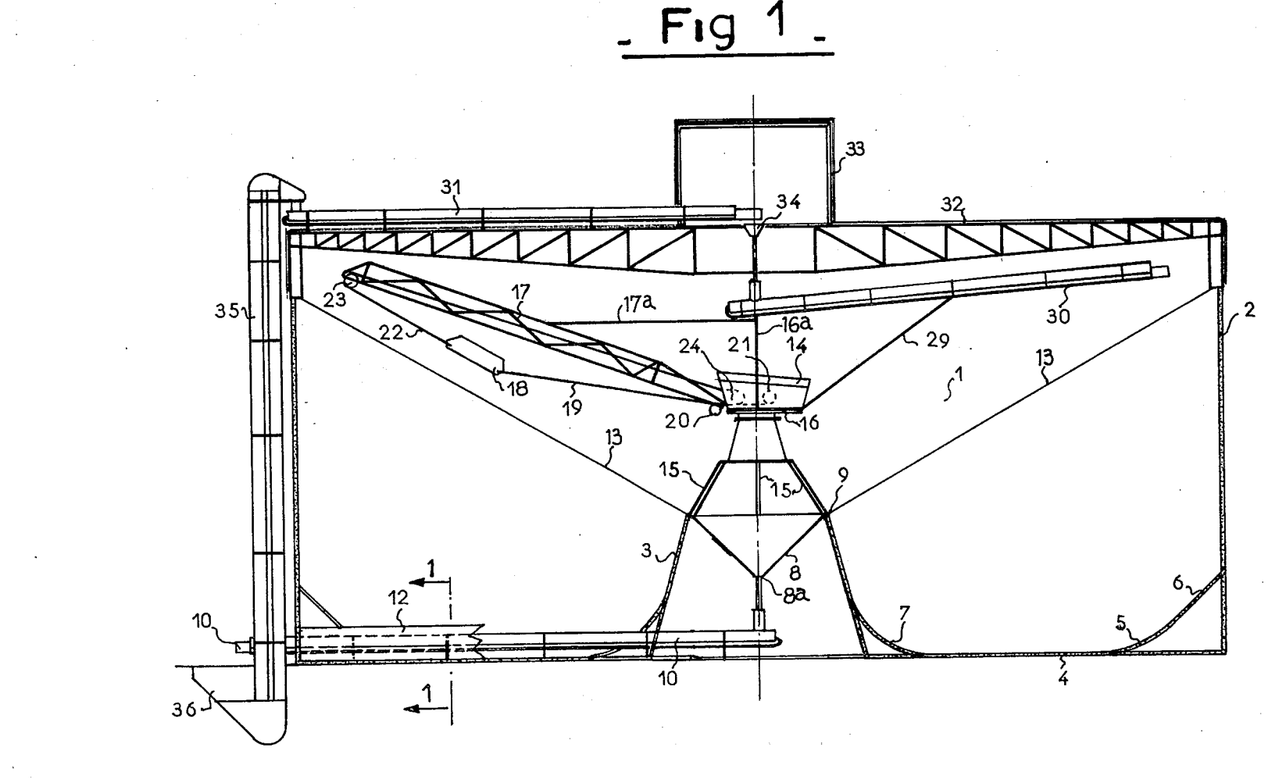
FIG. 1 is a vertical sectional view through the axis of a circular store.

The store 1 comprises a high outer cylindrical wall 2 which defines, in combination with a lower inner wall 3 in the form of a truncated cone and with a floor 4, an annular storage vessel. The floor 4 is connected to the wall 2 by a fillet portion 5 and a conical portion 6. Likewise, the floor 4 is connected to the wall 3 by a fillet portion 7.

The space defined inside the wall 3 is provided with a conical funnel 8 whose wide opening coincides with the upper edge 9 forming the small base of the conical wall 3. The lower aperture 8$^a$ of the funnel supplies a conveyor belt 10 disposed in a gallery 11 constituted by a slab 12 which bears on the floor 4 and on one of the radial partition walls 13 of the annular vessel.

The handling dragline 14 comprises a frame 16 mounted to pivot about a vertical axis coinciding with the axis of the store on a chassis carried by supports 15 which bear on the wall 3. The pivotal frame 16 supports a boom 17 which is supported by a cable or guy $17^a$ connected to a support $16^a$ of the frame 16. The end of the boom adjacent the frame is provided with a pulley 20 around which extends a raking cable 19 which is actuated by a winch 21 and connected to the corresponding end of a scoop 18 whose other end is connected to a handling cable 22 passing around a pulley 23 which is disposed at the end of the boom 17 opposed to the frame and is actuated by a winch 24.

Figure 3:
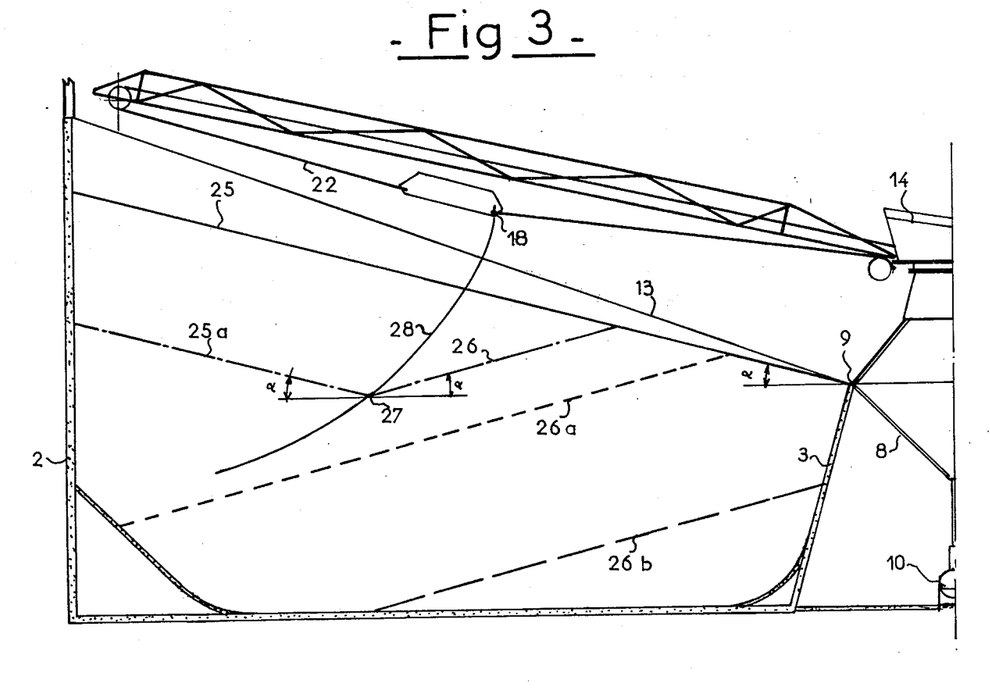
FIG. 3 is a vertical sectional view containing the axis of a bunker of the circular store showing the shape of the heap of product in the course of emptying. The full line corresponds to the full bunker, the dot-dash line to the first stage of emptying, the short dashed line to the second stage and the long dashed line to the third stage.

When a bunker defined by two radial partition walls 13 of the annular vessel is full, the product forms a heap whose surface is a cone 25 having an angle $\alpha$. In order to extract the product, the boom 17 is disposed above the bunker. The action of the scoop 18 first causes the sliding of the product along the surface 25 of the product which, in pouring over the upper edge 9 of the conical wall 3, falls into the funnel 8 and is discharged by the conveyor belt 10. As the heap is being used up, the scoop 18 raises the product which is poured always at 9 in such manner as to form a heap whose diagrammatic shape, in this first stage, is defined by three portions of a cone whose generatrix segments $25^a$ and 26 and a part of slope 25 form a broken line which connects the outer wall 2 to the upper edge 9 of the inner wall 3, each generatrix having an inclination equal to the angle $\alpha$ of the angle of rest of the heap of the product. The point of intersection 27 of the generatrices $25^a$ and 26 corresponds to the point of engagement of the scoop 18. It is determined by the length of the handling cable 22 at the end of the winding around its winch 24. The point 27 therefore describes an arc of a circle 28. In a second stage, there is no longer any product bearing on the vertical outer wall 2, the cone $25^a$ no longer exists. The cone 26 then assumes the position $26^a$. In a third stage, the cone 25 disappears and there only remains the cone $26^b$. At this moment, the product no longer rises up to the upper circle 9 of the wall 3. The scoop 18 rises at the end of the cycle along the wall 3 and pours the product directly into the funnel 8.

The frame 16 of the dragline 14 is supplied with a support 29 which serves, jointly with the support $16^a$, for the mounting of a conveyor belt 30 which is oriented radially and diametrally opposed to the boom 17. This belt 30 is supplied by a conveyor belt 31 disposed on the cover 32 (which is horizontal and has a very slight conicity) of the store and enters the centre skylight or opening 33. The belt 31 pours the product onto the belt 30 by way of a funnel 34 located on the axis of the store. The conveyor belt 31 is itself supplied with product by a vertical elevator 35 which is disposed outside the store in the vicinity of the wall 2 and takes the product from a pit 36 in which the product may be disposed by outside machines. For filling a bunker, the elevator 35 and the conveyor belts 30 and 31 are brought into operation and the frame and the boom of the dragline 14 are made to undergo the automatic motion of rotation, the scoop 18 being stationary.

The product pouring end of the conveyor belt 30 then moves alongside the wall 2 of the bunker to be filled and thus effects a complete filling thereof.

Figure 2:
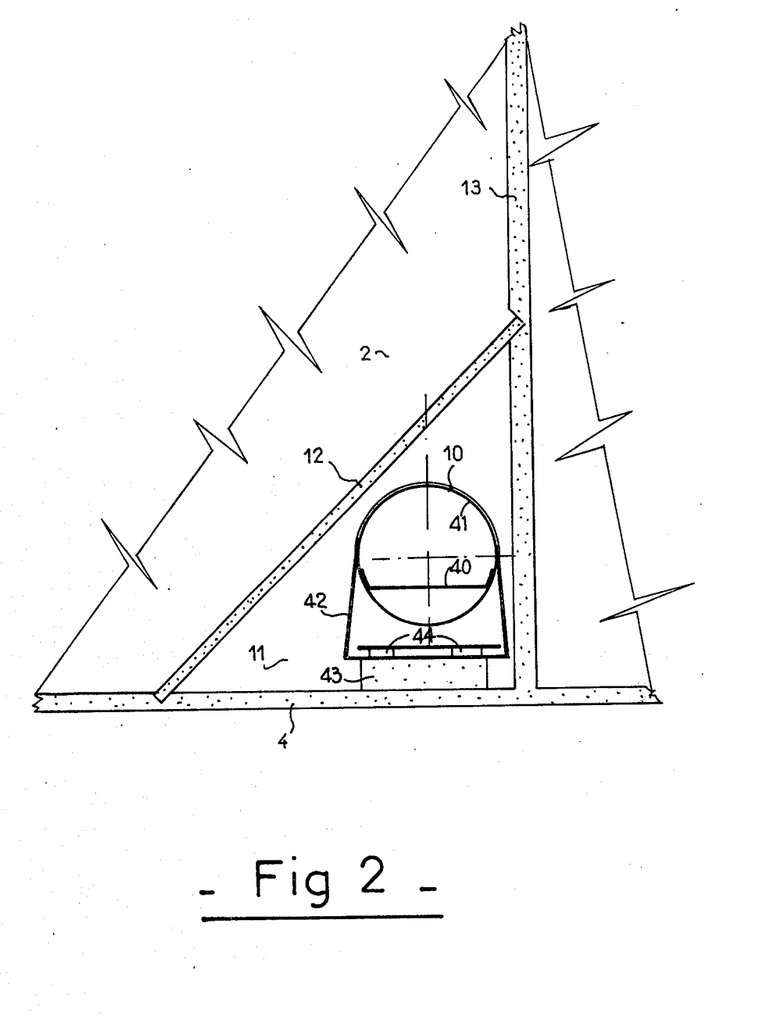
FIG. 2 is a sectional view to an enlarged scale on line 1—1 of FIG. 1.

Each of the conveyor belts 10, 30, 31 is of the known type shown diagrammatically in FIG. 2. The belt proper 40 is an endless reinforced rubber belt which passes around two end rollers (not shown), the upper reach of which belt is the active reach and slides along its edge portions on the inside of a rigid tube 41 of polyvinyl chloride which forms for this reach a sealed sheath which is mounted by supports 42 on a bearing element 43 which also supports two rails 44 in contact with which the lower return reach of the belt is guided. An electric motor incorporated in the conveyor drives one of the end rollers. In the present application, these tubular conveyors are employed owing to their specific advantages: protection of the product, lightness, small size.

SECOND EXAMPLE

The elements of the second embodiment comparable to those of the first embodiment carry the same reference characters increased by 100. The new elements are numbered from 201 on.

Figure 4:
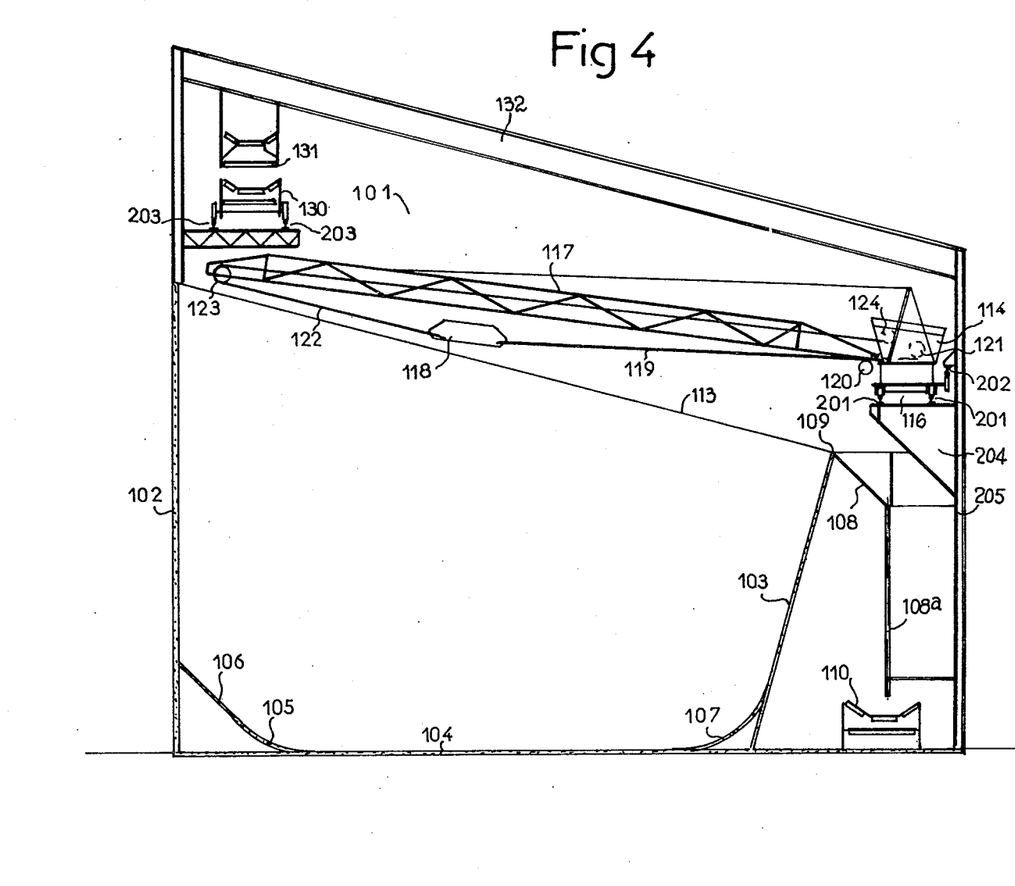
FIG. 4 is a vertical sectional view of a rectangular store in a plane perpendicular to the direction of displacement of a single dragline.

In the second embodiment, it can be seen that the cross-sectional view of a bunker or compartment of the prismatic vessel of the rectangular store 101 has exactly the same shape as in the case of the circular store. On the other hand, the frame 116 of the dragline 114, instead of being pivotal about a vertical axis, is movable in translation along two rails 201 supported by a console platform 204 integral with vertical pillars 205 of the store which define a second vertical planar wall of the store parallel to the first wall 102 and spaced from the inclined planar inner wall 103 of the vessel. The stability of the dragline is ensured by a counter-rail 202. The same automatism which caused, in each cycle, a slight angular displacement in the circular store, produces, in each cycle of the scoop 118, a slight longitudinal displacement of the dragline 114. The single funnel 8 is replaced by a series of adjoining funnels 108 which are disposed along the inner wall 103 and directly supply product, by way of a vertical tube $108^a$, to the conveyor belt 110 for discharging the product.

It will be understood that the emptying of the bunkers in the case of a longitudinal store is carried out in exactly the same way as in the case of a circular store. The filling of the store is carried out from an elevator (not shown) by means of a fixed conveyor belt 131 which is mounted under the cover or roof 132 and a conveyor belt on a carriage 130 whose longitudinal displacement along the rails 203, carried by a platform 206 in the form of a bracket, is controlled by the same electric automatic system as that employed for the displacement of the dragline 114. The complete filling of each bunker is thus ensured.

Figure 5:
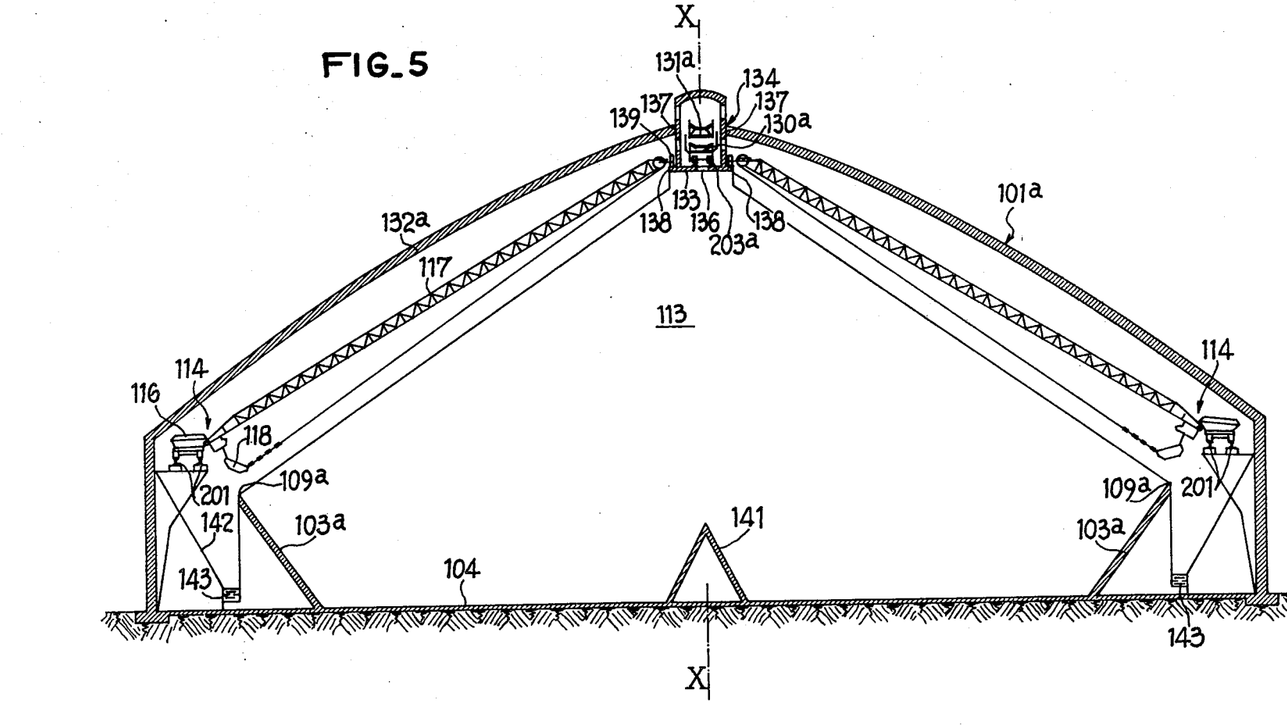
FIG. 5 is similar to FIG. 4 in the case of two draglines.

FIG. 5 is a modification of the embodiment shown in FIG. 4 in which the rectangular store $101^a$ has two draglines 114 which are movable on runways 201 disposed in the vicinity of the respective edges of the store symmetrically with respect to the vertical plane X—X through the longitudinal axis of the store. The corresponding vessel is no longer defined by one divergent wall 103 and a high vertical wall 102, but by two divergent walls $103^a$ which are disposed symmetrically and constitute abutment surfaces for the foot ends of the two heaps of the mass of product which are obtained by pouring from a horizontal chain conveyor 130, $130^a$ which is movable along a runway $203^a$ supported by the floor or base 133 of a box-structure girder 134 provided in the roof $132^a$ of the store the axis of which is in the plane X—X. In order to permit the product to fall freely, the floor 133 is hollowed out at 136 in vertical alignment with the movable conveyor $130^a$ which supports in sliding contact an upper horizontal fixed chain conveyor 131<sup>a</sup> supplied with product from a conveyor system which is for example similar to that shown in FIG. 1.

The floor 133 of the box-structure girder 134 extends beyond the vertical sides 137 and forms shoes 138 each of which defines a runway for a carriage 139 on which carriage bears the upper end of the corresponding dragline boom 117. The carriage is driven in synchronism with the system for translating the frame 116 of the dragline.

It will be observed that the upper centre beam 134 is assembled by its floor 133 with the transverse partition walls 113 which define the bunkers of the vessel so that this beam operates in the same manner of a continuous beam while contributing to the stability of the partition walls which are in this way not subjected to any tipping moment.

The projecting triangular prism 141 provided on the floor 104 occupies the lower centre volume of the vessel in which the scoop of the draglines cannot exert its action and which defines a dead zone to which the product must not have access.

The product extracted by the scoops 118 is poured over the upper edge 109<sup>a</sup> of the divergent walls 103<sup>a</sup> into prismatic hoppers 142 which supply horizontal discharging chain conveyors 143.

It will be understood that other modifications may be made while remaining within the scope of the invention.

In particular, in the case of a circular store, it may be of interest to replace the cylindrical wall 2 by a regular polygon having a large number of sides or replace the centre truncated cone 3 by a truncated pyramid.

As concerns the rectangular store shown in FIG. 4, the series of funnels 108 may be replaced by a simple pouring sheet, the conveyor belt 110 being raised to the vicinity of the edge 109. Also in this case, the moving carriage 130 could be eliminated, the belt 131 being equipped with a pouring device mounted on a carriage.

The vertical elevator 35 and the pit 36 (FIG. 1) may be replaced by a tubular conveyor having a belt, inclined for example at 40°, the base of which bears on the ground and which may be supplied directly from a truck or lorry which pours the product into a hopper. An intermediate conveyor element may be connected to the hopper and supplied with product by the discharge conveyor 10 or 110, in which case the end of the inclined conveyor opens onto a distributor which is capable of supplying the product either into the filling conveyor 31 or 131 or into a trough for the charging of a vehicle. The intermediate conveyor element may be employed for a continuous weighing of the product.

Having now described my invention what I claim as new and desire to secure by Letters Patent is:

1. An installation for storing and handling a granular or pulverulent product, comprising a store, a vessel located within the store and for storing the product and comprising a floor and upwardly extending wall means joined to the floor for retaining said product inside the vessel, said wall means including a wall which is upwardly and outwardly inclined relative to the interior of the vessel and defines an upper edge, at least one handling apparatus for extracting the product from the vessel and comprising a movable frame located outside the vessel adjacent said inclined wall, a rigid boom which is mounted on the frame to be movable relative to the vessel so that an end of the boom remote from said frame is movable in a path which is adjacent a region of the vessel laterally remote from the inclined wall and is higher than said edge, a dragline including a raking scoop and movably mounted on the boom so that the scoop is movable between a first position in which the scoop is adjacent said edge of said inclined wall and a second position in which the scoop is adjacent said end of the boom remote from the frame, means for shifting the dragline and scoop in an active scooping direction from said second position to said first position of the scoop to cause said product to pour over said edge of the inclined wall for reception by product discharge means and means for shifting the dragline and scoop in a return direction from said first position to said second position, and means for pouring said product into the vessel and located in said region and positioned higher than said edge of the inclined wall and adjacent said path of said end of the boom whereby a heap of said product can be formed in the vessel which has a natural slope which is downwardly inclined from said region to said edge of the inclined wall.

2. An installation as claimed in claim 1, wherein the scoop is open in its lower part and in its front part and closed on lateral sides in its upper part and in its rear part.

3. An installation as claimed in claim 1, comprising a vertical wall which defines with the inclined wall the interior of the vessel, the vertical wall having an upper end which is at a higher level than the upper edge of the inclined wall.

4. An installation as claimed in claim 1, comprising a discharge conveyor outside the vessel, guide surface means adjacent the upper edge of the inclined wall for supplying, by the effect of gravity, the discharge conveyor with the product that the scoop has caused to pour over the upper edge of the inclined wall.

5. An installation as claimed in claim 1, comprising a store roof and wherein the pouring means comprise an intermediate conveyor adjacent the roof of the store from which intermediate conveyor the filling of said region of the vessel is effected, an elevator outside the store, the elevator having a lower end for being supplied with product by means outside the installation and an upper end for supplying the product to the intermediate conveyor.

6. An installation as claimed in claim 5, wherein the lower end of the elevator is located in a pit for containing the product.

7. An installation as claimed in claim 1, wherein said wall means include vertical partition walls which divide the vessel into a plurality of bunkers.

8. An installation for storing and handling a granular or pulverulent product, comprising a substantially circular store, a substantially circular vessel located within the store and for storing the product and comprising a floor and upwardly extending wall means joined to the floor for retaining said product inside the vessel, said wall means including a wall which is upwardly and outwardly inclined relative to the interior of the vessel and defines an upper edge, at least one handling apparatus for extracting the product from the vessel and comprising a frame located outside the vessel adjacent said inclined wall and rotatable about a substantially vertical axis substantially in the centre of the store, a rigid boom which is mounted on the frame to be rotatable relative to the vessel so that an end of the boom remote from said frame is rotatable in a circular path which is adjacent a region of the vessel laterally remote from the inclined wall and is higher than said edge, a dragline including a raking scoop and movably mounted on the boom so that the scoop is movable between a first position in which the scoop is adjacent said edge of said inclined wall and a second position in which the scoop is adjacent said end of the boom remote from the frame, means for shifting the dragline and scoop in an active scooping direction from said second position to said first position of the scoop to cause said product to pour over said edge of the inclined wall for reception by product discharge means and means for shifting the dragline and scoop in a return direction from said first position to said second position, and means for pouring said product into the vessel and located in said region and positioned higher than said edge of the inclined wall and adjacent said path of said end of the boom whereby a heap of said product can be formed in the vessel which has a natural slope which is downwardly inclined from said region to said edge of the inclined wall.

9. An installation as claimed in claim 8, comprising a discharge conveyor outside the vessel, guide surface means adjacent the upper edge of the divergent wall for supplying, by the effect of gravity, the discharge conveyor with the product that the scoop has caused to pour over the upper edge of the divergent wall, the storage vessel being ring-shaped and having an inner wall which has substantially the shape of a truncated cone and constitutes said divergent wall and defines a space, a conical funnel being disposed in said space for supplying product to the discharge conveyor.

10. An installation as claimed in claim 8, comprising a fixed intermediate conveyor, a product pouring conveyor supported by the pivotal frame of the dragline and oriented in a radially and diametrally opposed direction to the boom relative to said vertical axis and positioned to be supplied with the product at a point in the centre of the store by the fixed intermediate conveyor.

11. An installation as claimed in claim 10, comprising a roof structure for the store and a center skylight in the roof structure in which skylight the fixed intermediate conveyor is capable of discharging the product.

12. An installation as claimed in claim 8, comprising a gallery extending through the vessel in the region of the floor of the vessel, the discharging conveyor being disposed in the gallery.

13. An installation as claimed in claim 8, comprising substantially vertical partition walls which divide the vessel into bunkers and extend radially from said vertical axis.

14. An installation for storing and handling a granular or pulverulent product, comprising a rectangular store, a vessel having a prismatic shape located within the store and for storing the product and comprising a floor and upwardly extending wall means joined to the floor for retaining said product inside the vessel, said wall means including a wall which is upwardly and outwardly inclined relative to the interior of the vessel and defines an upper edge, at least one handling apparatus for extracting the product from the vessel and comprising a frame located outside the vessel adjacent said inclined wall and movable in translation alongside said inclined wall, a rigid boom which is mounted on the frame to be movable relative to the vessel so that an end of the boom remote from said frame is movable in a path which is adjacent a region of the vessel laterally remote from the inclined wall and is higher than said edge, a dragline including a raking scoop and movably mounted on the boom so that the scoop is movable between a first position in which the scoop is adjacent said edge of said inclined wall and a second position in which the scoop is adjacent said end of the boom remote from the frame, means for shifting the dragline and scoop in an active scooping direction from said second position to said first position of the scoop to cause said product to pour over said edge of the inclined wall for reception by product discharge means and means for shifting the dragline and scoop in a return direction from said first position to said second position, and means for pouring said product into the vessel and located in said region and positioned higher than said edge of the inclined wall and adjacent said path of said end of the boom whereby a heap of said product can be formed in the vessel which has a natural slope which is downwardly inclined from said region to said edge of the inclined wall.

15. An installation as claimed in claim 14, wherein the pouring means comprise a product supply conveyor and two conveyors, one of which two conveyors is fixed in position relative to the vessel to receive the product from the product supply conveyor and to discharge the product onto the other of said two conveyors which is movable in translation relative to the vessel.

16. An installation as claimed in claim 4, wherein the discharge conveyor is tubular and comprises a rigid tube of plastics material, means for supporting the tube, an endless belt having an active rech guided in contact with an inner face of the tube, the endless belt having a return reach which passes within the support means.

17. An installation as claimed in claim 5, wherein the elevator comprises an inclined tubular conveyor.

18. An installation as claimed in claim 1, having means for supporting said end of the boom opposed to the frame and comprising a runway, a carriage movably guided on the runway, said end of the boom bearing on the carriage, and means for driving the carriage in a movement synchronized with the movement of the frame.

19. An installation as claimed in claim 14, comprising two said handling apparatus, the vessel being defined by two said inclined walls which are in laterally spaced upwardly divergent relation, runways being disposed adjacent the respective inclined walls, the frames of the two handling apparatus being movable in translation on said runways.

20. An installation as claimed in claim 19, wherein the pouring means comprise a product supply conveyor and two conveyors, one of which two conveyors is fixed in position relative to the vessel to receive the product from the product supply conveyor and to discharge the product onto the other of said two conveyors which is movable in translation relative to the vessel, transverse vertical partition walls connected to the two inclined walls divide the vessel into a plurality of bunkers, an upper box-structure girder is assembled with the transverse partition walls and the conveyors of the pouring means are mounted inside the girder.

* * * * *